3,336,756
ANCHORING SYSTEM FOR PIVOT BEARINGS FOR FLOOD GATES

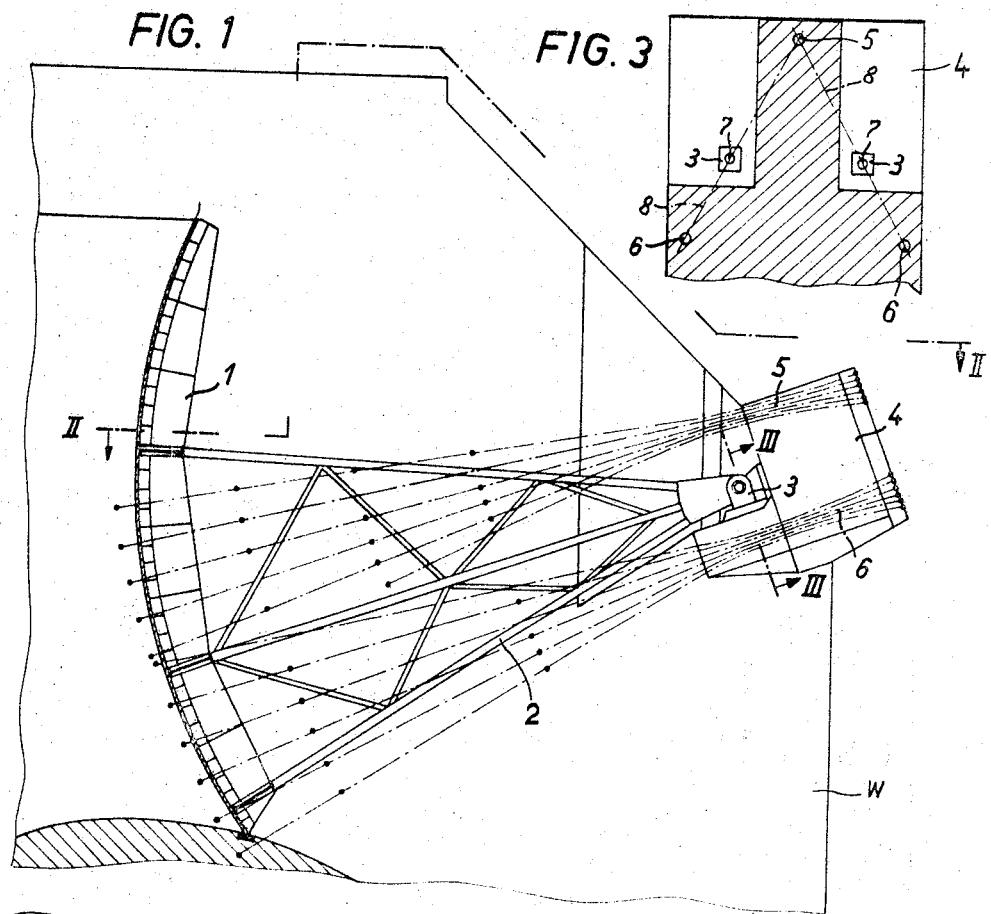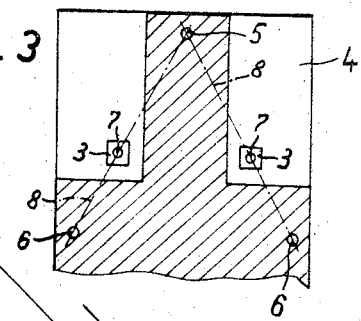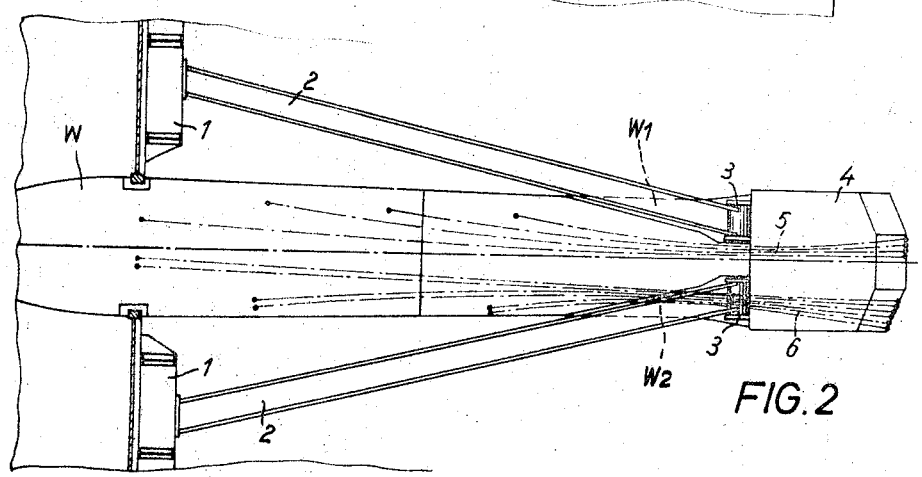

Wilhelm Isenberg and Hans Schulz, Rheinhausen, Germany, assignors to Beteiligungs- und Patentverwaltungsgesellschaft mit beschränkter Haftung, Essen, Germany
Filed Feb. 1, 1965, Ser. No. 429,238
Claims priority, application Germany, Feb. 5, 1964, B 75,298
1 Claim. (Cl. 61—25)

ABSTRACT OF THE DISCLOSURE

The present invention concerns an anchoring system for pivot bearings for flood gates by means of two groups of tie-rods having portions thereof above said bearings and by means of two groups of tie-rods having portions underneath said bearings while said tie-rod portions above said pivot bearings are within the range of the latter arranged so close to each other as to form a substantially single upper anchoring point whereas the tie-rod portions underneath said bearings respectively form two spaced lower anchoring points, said upper anchoring point and said lower anchoring points are so located relative to the centers of said bearings that straight lines through said lower anchoring points and the center of the respective adjacent bearings intersect in said upper anchoring point.

---

The present invention relates to an anchoring system for two pivot bearings arranged in recesses on opposite sides of a weir pillar or a weir wall and intended for segmental flood gates which are carried by supporting arms extending at an angle with regard to the longitudinal central plane of the weir pillar and into said recesses where they are pivotally connected to said pivot bearings. More specifically, the present invention relates to an anchoring system of the just-mentioned type, in which the anchoring of the two pivot bearings is effected by means of two pairs of strands of tie-rods one of said pairs having a section above and the other one of said pairs having a section below said bearings.

Generally, the forces acting upon a segmental flood gate are through a pivot bearing conveyed into the weir wall by means of tie-rods. Within the range of the pivot bearings, the tie-rods are only slightly spaced from each other because in the first place, the weir wall or pillar has to be made rather narrow for flow technical reasons, and furthermore due to the recesses into which the supporting arms for the flood gates extend, there remains only a relatively narrow cross-section.

When an arrangement of the above type comprises two adjacent segmental flood gates, there will at times occur a situation in which one of the flood gates is in closing position, i.e. is under load, whereas the other flood gate is in open position, which means it is under no load. In such an instance considerable uni-lateral loads occur. Due to the rather narrow base for the anchoring arrangement, very unfavorable lever effects are encountered which may many times increase the forces to be absorbed by the tie-rods, so that for the said possible situation, expensive constructions are unavoidable.

Suggestions have been advanced to arrange the strands of tie-rods above and below the lateral recesses into which the supporting arms of the flood gates extend. With such an arrangement, the width of the base for the anchoring arrangement is considerably increased over the above-mentioned prior art construction, and the unfavorable lever effects are avoided to a greater extent. However, inasmuch as the lateral recesses in the weir wall must be rather large in view of the considerable tilting angle necessary for the segmental flood gates, this anchoring system is not suitable for high segmental flood gates, aside from the fact that it requires the additional expenses of relatively long traverses or girders.

It is, therefore, an object of the present invention to provide an anchoring arrangement for the pivot bearings of segmental flood gates and the like, which will overcome the above-mentioned drawbacks.

It is another object of this invention to provide an anchoring system of the type set forth above which will be suitable for large segmental flood gates without requiring unduly long traverses and without unduly heavy weir walls.

These and other objects and advantages of the invention will appear more clearly from the following specification in connection with the accompanying drawing, in which:

FIGURE 1 diagrammatically illustrates a longitudinal section of a segmental flood gate;

FIGURE 2 is a section taken along the line II—II of FIGURE 1; and

FIGURE 3 is a section taken along the line III—III of FIGURE 1.

As stated above, the present invention concerns an anchoring arrangement for pivot bearings provided for segmental flood gates and arranged in lateral recesses of a weir wall or pillar, while the segmental flood gates are connected to supporting arms extending at an angle into said recesses, and while two pairs of strands of tie-rods are provided for anchoring said bearings, one of said pairs having a section located above and the other one of said pairs having a section located below said bearings. The anchoring arrangement according to the invention is characterized in that the two tie-rod strand sections above said pivot bearings are, within the range of said pivot bearings, combined to one anchoring point.

More specifically referring to the drawing, the arrangement shown therein comprises segmental flood gates 1 respectively connected to supporting arms 2 which converge toward each other at those ends which are remote from said flood gates, and extend into lateral recesses W1 of the weir wall or weir pillar W. Within said recesses there are provided pivot bearings 3 to which said supporting arms 2 are pivotally connected to permit upward and downward tilting movement of flood gates 1. As will be seen from the drawing, the segmental flood gates 1 thus rest through bearings 3 on a traverse or arm 4 which latter is held by weir wall W by means of two strands 5 of tie-rods arranged partially above bearings 3. Traverse 4 is furthermore held by two strands of tie-rods 6 arranged below said pivot bearings 3. FIGS. 1 and 2 show only one of each pair of tie-rods 5 and 6 by dot-dash lines.

According to a further development of the invention, within the range of the pivot bearings 3, the distances between the two strands of tie-rods above the bearings 3 and two strands of tie-rods 6 below said bearings 3 are so selected that the points of attack 7 (FIG. 3) of the forces acting upon the flood gates and conveyed by supporting arms 2 are located on the substantially straight connecting lines 8 connecting the common anchoring point of the strands of upper tie-rods 5 with the respective anchoring points of the two lower strands of tie-rods within the range of bearings 3, strands 5 being combined to one anchoring point, and the two lower strands of tie-rods 6 being respectively combined to two lower anchoring points (only one of the strands 5 and 6 being shown in FIGS. 1 and 2). In this way, an increase in the load acting upon the bearings due to unfavorable lever effects, will be impossible so that with this anchoring arrangement, the cross-section of the tie-rods can be kept considerably smaller than with heretofore known arrangements of the type involved.

It is, of course, to be understood that the present invention is, by no means, limited to the particular arrangement shown in the drawing, but also comprises any modifications within the scope of the appended claim.

What we claim is:

In combination with a weir pillar having a relatively long and narrow cross section and having recesses respectively arranged on opposite sides of said pillar; bearing means respectively arranged in said recesses for pivotally receiving segmental flood gates, a traverse connected to that portion of said pillar which carries said bearing means, and means including a first and a second pair of strands of tie-rods embedded in said pillar and said traverse for anchoring said bearing means, the tie-rods of each strand of each of said pairs of strands diverging from an area within the range of said bearing means both in the direction toward the free end face of said traverse and in the opposite direction, said first pair of strands of tie-rods having those of its sections which are within the range of said bearing means located at a level higher than that of said bearing means and arranged in laterally closed relationship to each other so as together to form a substantially single upper anchoring station in said traverse, and said second pair of strands of tie-rods having those of its sections which are within the range of said bearing means anchored in said traverse at a level lower than that of said bearing means so as respectively to form two lower anchoring stations, the spacing between said two lower anchoring stations and the distance between said lower anchoring stations and said upper anchoring station and the location of said upper anchoring station and of said lower anchoring stations relative to said bearing means being such that straight lines through the center of said bearing means and of said lower anchoring stations intersect at said upper anchoring station.

References Cited

UNITED STATES PATENTS 2,871,664   2/1959   Dobell _____ 61—25

FOREIGN PATENTS 649,746   10/1962   Canada.

EARL J. WITMER, *Primary Examiner.*